United States Patent Office 2,992,066
Patented July 11, 1961

2,992,066
PREPARATION OF PLUTONIUM TRIFLUORIDE
Leland L. Burger and William E. Roake, Richland, Wash., assignors to the United States of America as represented by the United States Atomic Energy Commission
No Drawing. Filed Apr. 15, 1954, Ser. No. 423,546
5 Claims. (Cl. 23—14.5)

This invention deals with the production of plutonium trifluoride, and in particular with the production of plutonium trifluoride from plutonium oxalate.

One of the processes frequently used for the production of metallic plutonium is based on the reduction of plutonium halide with calcium or other alkaline earth metals in a bomb. The preferred halide for this process is the plutonium trifluoride.

Before the reduction process just described it is usually necessary to recover plutonium from aqueous solutions in the form of a salt. One preferred method for doing this is by precipitating the plutonium in the form of the oxalate, mostly as the plutonium (IV) oxalate. In order to convert the plutonium oxalate to the trifluoride for the bomb process above described, a fluorination step is necessary. Hydrogen fluoride is the customary fluorination agent. The plutonium fluoride obtained thereby, under normal conditions, is the plutonium tetrafluoride or at least a product which contains considerable quantities of tetrafluoride. This tetrafluoride then has to be reduced to the trifluoride in order to have the proper starting material for the bomb process.

Conversion of plutonium tetrafluoride to the trifluoride, for instance, can be carried out by heating it in vacuo at between 700 and 1200° C., or by reduction with hydrogen or hydrogen plus hydrogen fluoride at elevated temperatures below 900° C., as is described in the copending application Serial No. 752,269, filed by Joseph J. Katz et al. on June 3, 1947.

Anhydrous plutonium trifluoride has also been prepared directly from the plutonium oxalate by treating the latter with an anhydrous mixture of hydrogen fluoride and hydrogen at 550 to 600° C.

One disadvantage inherent in all these processes just described is that the use of hydrogen fluoride at these relatively high temperatures creates quite a corrosion problem. Another factor not very favorable is that the final product of these processes has a relatively low bulk density (between 1.6 and 2.2) which is not very desirable for use in the bomb reduction process.

It is an object of this invention to provide a process for the production of plutonium trifluoride from plutonium oxalate by which the above-described drawbacks are overcome.

It is thus an object of this invention to provide a process for the production of plutonium trifluoride from plutonium oxalate in which the use of highly corrosive reagents at very high temperatures is not necessary so that the equipment can be made of less corrosion-resistant material.

It is also an object of this invention to provide a process for the production of plutonium trifluoride from plutonium oxalate in which the final product has a density higher than had been obtained by the processes used heretofore.

It is another object of this invention to provide a process for the production of plutonium trifluoride from plutonium (IV) oxalate in which reduction and fluorination are carried out in one step and with one reagent.

It is finally also an object of this invention to provide a process for the production of plutonium trifluoride from plutonium oxalate which gives a high yield of metallic plutonium when reduced with calcium in the so-called bomb processs.

These and other objects are accomplished by contacting dry plutonium oxalate with a chlorofluorinated methane or ethane at elevated temperature and allowing the plutonium trifluoride formed thereby to cool while excluding oxygen.

The process is equally well operative for plutonium (III) oxalate and plutonium (IV) oxalate. A special advantage is obtained when plutonium (IV) oxalate is used, because the chlorofluorinated hydrocarbon then has a dual function, namely, that of a reducing agent and of a fluorination means.

The temperature best suitable is between 400 and 450° C., 425° C. being preferred.

While all chlorofluorinated methanes and ethanes are satisfactory for the process of this invention, the dichlorodifluoromethane has been found best.

The preferred embodiment of carrying out the process of this invention comprises adding oxalic acid or a water-soluble oxalate to a plutonium salt-containing aqueous solution, e.g. $Pu(NO_3)_4$, separating the slurry obtained thereby from the solution and drying the slurry to a cake by heating it in a platinum or nickel vessel for one to three hours at 100 to 150° C. Heating has to be carried out while excluding oxygen; this is done by passing a current of either chlorofluorinated hydrocarbon or argon or nitrogen gas through the container. The chemically bound water is then removed by heating to about 225° C., also in a stream of protective gas. Thereafter reaction proper is effected by heating to the reaction temperature of 425° C. for at least one hour while passing the dichlorodifluoromethane over the plutonium compound. After completion of the reaction the plutonium trifluoride formed is allowed to cool; an atmosphere of protective gas is maintained in the vessel during this cooling procedure until the temperature is at least below 100° C. The final product was lavender to dark blue and was free flowing.

According to another embodiment of the process, the dried plutonium (IV) oxalate formed as just described, prior to fluorination, is subjected to a heating step in an oxygen-containing atmosphere, such as air, whereby the oxalate is decomposed and the $PuO_2$ formed. The optimal temperature for this step is between 275 and 300° C., but should not exceed 400° C. Treatment of the plutonium oxide with the chlorofluorinated hydrocarbon is then carried out as described above.

In the following, two examples are given for the purpose of illustrating the process of this invention without the intention to have the invention limited to the specific details given therein.

*Example I*

From an aqueous solution containing 1.35 grams of plutonium in the form of $Pu(NO_3)_4$ the plutonium was precipitated by adding oxalic acid. The oxalate slurry thus obtained was washed with a solution 0.1 M in nitric acid and 0.1 M in oxalic acid, thereafter washed with water and then decanted. The slurry then contained about 30% by volume of water; it was transferred to a platinum reaction boat and dried there in a stream of argon (flow rate about 0.5 lineal foot/min.) at 105° C. for ½ hour. Argon flow was then continued while the temperature was raised to and held at 225° C. for 1½ hours whereby the chemically bound water was removed.

Thereafter the argon was replaced by a current of dichlorodifluoromethane flowing at a rate of ⅓ lineal foot/min., and the temperature at the same time was increased to 425° C. and held there for 2 hours. Cooling was then allowed to take place while the gas flow was still kept up until the temperature had reached about 90° C. Air was then admitted.

The reaction product weighed 1.67 grams and contained 18.7% by weight of fluorine (theoretical fluorine content is 19.0%) and 0.1% by weight of chlorine. The bulk density of the plutonium trifluoride was about 3.5.

*Example II*

To an aqueous solution containing 80.04 grams of plutonium in the form of $Pu(NO_3)_4$ oxalic acid was added. The precipitate formed was washed first with a mixture of nitric and oxalic acids (0.1 M as to each) and then with water until free of $NO_3^-$, and the slurry was then transferred to a platinum boat; it formed a layer there which was about ½ inch deep. The boat was heated to between 125 and 150° C. for 3 hours in a current of air having a flow rate of 0.5 lineal foot/min., whereby all of the water was removed. Thereafter the temperature was raised to between 275 and 300° C. and held there for about 1 hour while the air current was continued; the plutonium oxalate was thereby converted to the oxide.

Thereafter a current of dichlorodifluoromethane (⅓ lineal foot/min.) was substituted for the air stream, the temperature was raised at the same time to 400° C. and maintained for 2 hours. The product was cooled to below 100° C. in the current of dichlorodifluoromethane, and then the latter was discontinued and air was admitted.

The plutonium trifluoride obtained weighed 98.9 grams and contained about 81.0% of plutonium and about 18.2% of fluorine and 0.5% of chlorine. The bulk density of the product was 3.35.

Both examples clearly show the great improvement which this process brings about, in particular as to density, over the processes used heretofore.

It will be understood that this invention is not to be limited to the details given herein but that it may be modified within the scope of the appended claims.

What is claimed is:

1. A process of producing plutonium trifluoride from plutonium (IV) oxalate comprising contacting said plutonium (IV) oxalate in the dry state with a chlorofluorinated hydrocarbon selected from the group consisting of methane and ethane at a temperature of between 400 and 450° C. in an atmosphere consisting of said chlorofluorinated hydrocarbon and allowing the plutonium trifluoride formed thereby to cool while excluding oxygen.

2. The process of claim 1 wherein the chlorofluorinated hydrocarbon is dichlorodifluoromethane.

3. A process of producing plutonium trifluoride comprising adding oxalic acid anions to an aqueous solution containing plutonium (IV) values whereby a precipitate of plutonium (IV) oxalate forms; separating said precipitate; removing water from said precipitate by first heating at about 100° C. and then at about 225° C. while maintaining an oxygen-free atmosphere; heating to between 400 and 450° C. while passing dichlorodifluoromethane over the dried product; and allowing the plutonium trifluoride formed to cool to below 100° C. while excluding oxygen.

4. A process of producing plutonium trifluoride, comprising adding oxalic acid to an aqueous solution of plutonium (IV) nitrate, whereby plutonium oxalate precipitates; separating the precipitate from a supernatant; drying the oxalate in a current of argon at about 105° C.; removing the chemically bound water by heating to about 225° C. in an argon current; replacing the argon current by a current of dichlorodifluoromethane while a temperature of 425° C. is maintained; and cooling the material to 90° C. while continuing the current of dichlorodifluoromethane.

5. A process of producing plutonium trifluoride, comprising contacting water-free plutonium (IV) oxalate with an atmosphere consisting of dichlorodifluoromethane at a temperature of about 425° C. and cooling the plutonium trifluoride to 90° C. in said atmosphere of dichlorodifluoromethane.

References Cited in the file of this patent

Seaborg et al.: The Transuranium Elements, pages 936 and 938 (1949), McGraw-Hill Book Co., Inc., NNES IV–14B.

Katz et al.: The Chemistry of Uranium, pages 362–4 (1951). McGraw-Hill Book Co., Inc., NNES VIII–5.

Seaborg et al.: The Actinide Elements, pages 376 and 420–1 (1954). McGraw-Hill Book Co., Inc., NNES IV–14A.

Seaborg: Chemical and Engineering News, vol. 23, pages 2190–3, 1945.